(12) United States Patent
DeMent et al.

(10) Patent No.: US 7,877,550 B2
(45) Date of Patent: *Jan. 25, 2011

(54) BUS CONTROLLER INITIATED WRITE-THROUGH MECHANISM WITH HARDWARE AUTOMATICALLY GENERATED CLEAN COMMAND

(75) Inventors: Jonathan James DeMent, Austin, TX (US); Kerey Michelle Tassin, Austin, TX (US); Thuong Quang Truong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/273,576

(22) Filed: Nov. 19, 2008

(65) Prior Publication Data

US 2009/0077323 A1   Mar. 19, 2009

Related U.S. Application Data

(63) Continuation of application No. 10/916,969, filed on Aug. 12, 2004, now Pat. No. 7,472,229.

(51) Int. Cl.
*G06F 12/00* (2006.01)
(52) U.S. Cl. .................... 711/142; 711/141; 711/145; 711/146
(58) Field of Classification Search .......... 711/141, 711/142, 146, 150, 152, 128
See application file for complete search history.

(56) References Cited

U.S. PATENT DOCUMENTS

| 5,404,489 | A | 4/1995 | Woods et al. |
| 5,652,859 | A | 7/1997 | Mulla et al. |
| 6,269,428 | B1 | 7/2001 | Carpenter et al. |
| 2002/0112130 | A1 | 8/2002 | Arimilli et al. |
| 2002/0129211 | A1 | 9/2002 | Arimilli et al. |
| 2003/0018877 | A1 | 1/2003 | Gaskins et al. |
| 2004/0199902 | A1 | 10/2004 | Dodson et al. |
| 2005/0010718 | A1 | 1/2005 | Yahagi |

*Primary Examiner*—Yong Choe
(74) *Attorney, Agent, or Firm*—Stephen J. Walder, Jr.; Matthew B. Talpis

(57) ABSTRACT

A write-through cache scheme is created. A store data command is sent to a cache line of a cache array from a processing unit. It is then determined whether the address of the store data is valid, wherein the original data from the store's address has been previously loaded into the cache. A write-through command is sent to a system bus as a function of whether the address of the store data is valid. The bus controller is employed to sense the write-through command. If the write-through command is sensed, a clean command is generated by the bus controller. If the write-through command is sensed, the store data is written into the cache array, and the data is marked as modified. If the write-through command is sensed, the clean command is sent onto the system bus by the bus controller, thereby causing modified data to be written to memory.

16 Claims, 2 Drawing Sheets

BUS CONTROLLER INITIATED WRITE-THROUGH MECHANISM WITH HARDWARE AUTOMATICALLY GENERATED CLEAN COMMAND

This application is a continuation of application Ser. No. 10/916,969, filed Aug. 12, 2004, status awaiting publication.

TECHNICAL FIELD

The present invention relates generally to bus controllers and, more particularly, to use of a write-through command with a bus controller.

BACKGROUND

In modern computer architecture, there is a design arrangement referred to as a write-through system. This is when a computing system has the property that whenever the processor stores or modifies information in a local cache, it then immediately modifies the information in a system memory and all other caches in the system in order to maintain coherent data.

In conventional technologies, software operating on a processor issues the command to modify data in the local cache. After modification of the cache, software pushes a copy of the newly written data out to the system over a system bus, using alternate commands known as a DCBF (FLUSH) or DCBST (DCLEAN).

Generally, the DCBF/Flush is a software instruction/coherent bus operation sent to all processors in the system. Any cache holding a cache line with that address will have to invalidate that line Also, if the data in the cache is non-coherent with memory it will be pushed out to main memory. DCBF is an instruction initiated by software. Flush is a coherent bus command. DCBF causes a Flush on the bus. DCBST/DCLEAN is a software instruction/coherent bus operation sent to all processors in the system. Any cache holding a cache line with the address referenced by the DCBST/DCLEAN that has data that is non-coherent with memory will push the data out to main memory. The cache will still hold the line valid after the data is pushed. DCBST is an instruction initiated by software. DCLEAN is a coherent bus command. DCBST causes a DCLEAN on the bus.

However, problems exist with the use of software to generate the coherency commands that are passed onto the bus (DCBF and DCBST). Employment of software uses processing cycles within the processor, which could better be directed to other projects.

Therefore, there is a need to do a write-through system-wide command without software in such a manner that addresses at least some of the problems associated with conventional system-wide write commands.

SUMMARY OF THE INVENTION

The present invention provides for creating a write-through cache scheme. A store data command is sent to a cache line of a cache array from a processing unit. It is then determined whether the address of the store data is valid, wherein the original data from the store's address has been previously loaded into the cache. A write-through command is sent to a system bus as a function of whether the address of the store data is valid. The bus controller is employed to sense the write-through command. If the write-through command is sensed, a clean command is generated by the bus controller. If the write-through command is sensed, the store data is written into the cache array, and the data is marked as modified. If the write-through command is sensed, the clean command is sent onto the system bus by the bus controller, thereby causing modified data to be written to memory.

BRIEF DESCRIPTION OF THE DRAWINGS

For a more complete understanding of the present invention, and the advantages thereof, reference is now made to the following Detailed Description taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

In the remainder of this description, a processing unit (PU) may be a sole processor of computations in a device. In such a situation, the PU is typically referred to as an MPU (main processing unit). The processing unit may also be one of many processing units that share the computational load according to some methodology or algorithm developed for a given computational device. For the remainder of this description, all references to processors shall use the term MPU whether the MPU is the sole computational element in the device or whether the MPU is sharing the computational element with other MPUs, unless otherwise indicated.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

Figure 1:
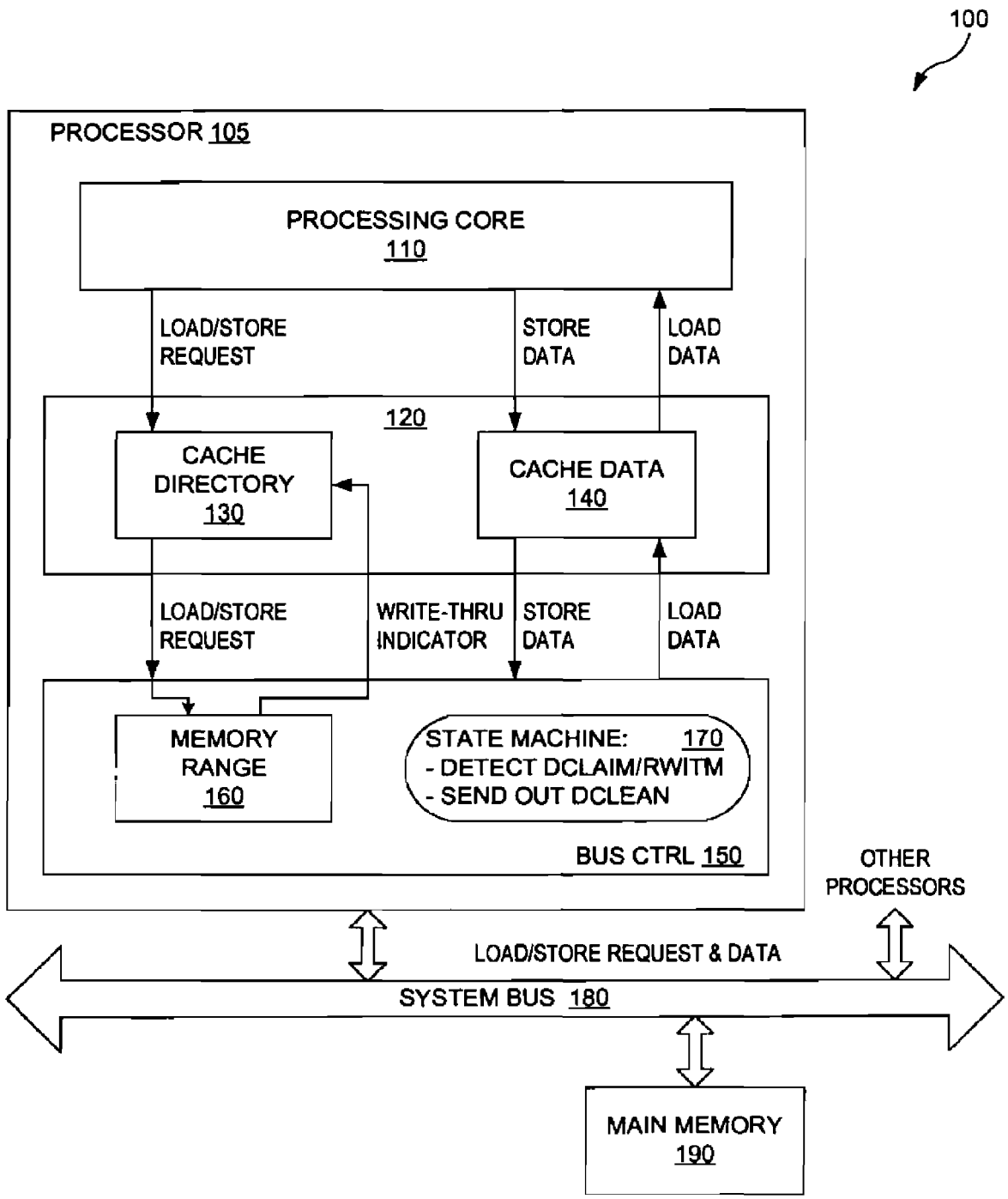
FIG. 1 schematically depicts a system for generating a coherent bus command.

Turning to FIG. 1, disclosed is a system 100 for performing write-through commands over a bus. Generally, the present invention provides for the above two commands (DCBF or DCBST) generated by software to be replaced by a DCLEAN being generated in hardware. In FIG. 1, a processor 105 of a system 100 decides that a data line in a local cache 140 is to be modified. The processor 105 then sends a store data command from a processing core 110 to the cache 140 of a cache complex 120.

Before the processor 105 can modify the cache 140 of a cache complex 120, it has to have sole ownership of the line. This is done in one of two ways. First, if the cache directory 130 indicates the cache 140 does not contain the cache line, a Read With Intent To Modify (RWITM) is sent to the bus. Second, if the cache directory 130 indicates the cache 140 does contain the cache line (that is, the cache line is valid), the processor 105 must send a DCLAIM to invalidate the line in any other processors in system 100. DCLAIM is a coherent bus operation sent to all processors in the system when one cache is trying to convert a line in its cache from a shared state to a modified state (i.e. the data will be written to a new value). It causes all other caches that have the line to mark it invalid.

This allows processor 105 to have sole ownership of the cache line. Then the store data command from the processing core 110 updates the cache directory 130 with the fact that cache 140 has been modified. The cache directory 130 is used to tell if the cache line is valid and if it has been modified.

As this is a modification to the local cache, a write-through command must be performed. In other words, the rest of the system 100, the other processors and a main memory 190, have to be brought into coherency with the data line in the cache 140.

The coherency control of generating the write-through commands occurs within a bus controller 150. Within the bus controller 150 two things happen. First, a memory range 160 is within the bus controller 150. The memory range 160 contains a set of addresses that are indicated as having a write-through requirement. In other words, only the addresses contained in this memory range will be marked as having a write-through requirement. Secondly, a monitor 170, such as a state machine (that is, the state machine monitors for certain specific inputs) is employed within the bus controller 150. The monitor 170 looks for two different commands that indicate the cache will be modified in processor 105.

The commands generated by the monitor 170 handle the write-through requirement for maintaining data coherency. These commands are sent out on the system bus 180 and monitored by all other processors in the system 100. Each processor 105 has a bus controller 150 that both sends and receives these commands. This allows all caches in the system 100 to maintain coherency with each other and the main memory 190. One such command is a DCLAIM command. Generally, DCLAIM is a bus command that indicates that a cache is trying to convert a line in its cache from a shared state to a modified state (that is, data in the cache 140 is already valid and will be written to a new value). The DCLAIM command causes all other caches in "other processors" that have the data line corresponding to this address to mark their data lines as invalid. The second command that the monitor 170 sends and receives is a RWITM (Read With Intent to Modify.). Generally, the RWITM is a coherent bus command that indicates that a cache is trying to load a cache line that it does not hold valid so that it can modify it with store data. The command is sent to all processors and causes them to invalidate this cache line in their cache if they have it valid.

The monitor/state machine 170 checks for these two commands (DCLAIM or RWITM) that were initiated by a store generated by software in the processing core 110. The processing core 110 generates a store. The RWITM and DCLAIM are bus commands generated by hardware in response to the store. Typically, it does not matter how these commands get to the bus as long as the two generic commands are seen on the bus. If either of these commands were detected, then the bus controller 150, in hardware, generates a DCLEAN command. The data is only pushed to memory if the cache holds non-coherent memory (this will only apply to the processor that has just done the store). Other processors in the system should no longer hold the cache line valid because the two bus commands (DCLAIM and RWITM) that initiated the whole process both invalidate the line in all other caches in the system. This command is sent out by the bus controller 150 hardware onto the system bus 180, which is then carried to other processors and main memory 190.

By implementing a monitor/state machine 170 capable of generating the DCLAIM and RWITM commands automatically, software is no longer required to force write-through coherency of data on its own. This allows the processor to do other useful work while the monitor/state machine 170 takes care of maintaining write-through coherency automatically.

The memory range 160 is an optional component that allows software to be more specific about what address ranges of memory have the write-through coherency requirement. The processor 105 provides a means of setting this memory range via software instructions. The memory range 160 acts as filter on the memory addresses seen by the monitor/state machine 170. If the memory address is within range, the monitor/state machine 170 will maintain the write-through coherency property for the memory address without any further software assistance. If the memory address falls outside of the range, then the monitor state machine 170 ignores the memory address and software must assume responsibility for any write-through coherency on this memory address.

Figure 2:
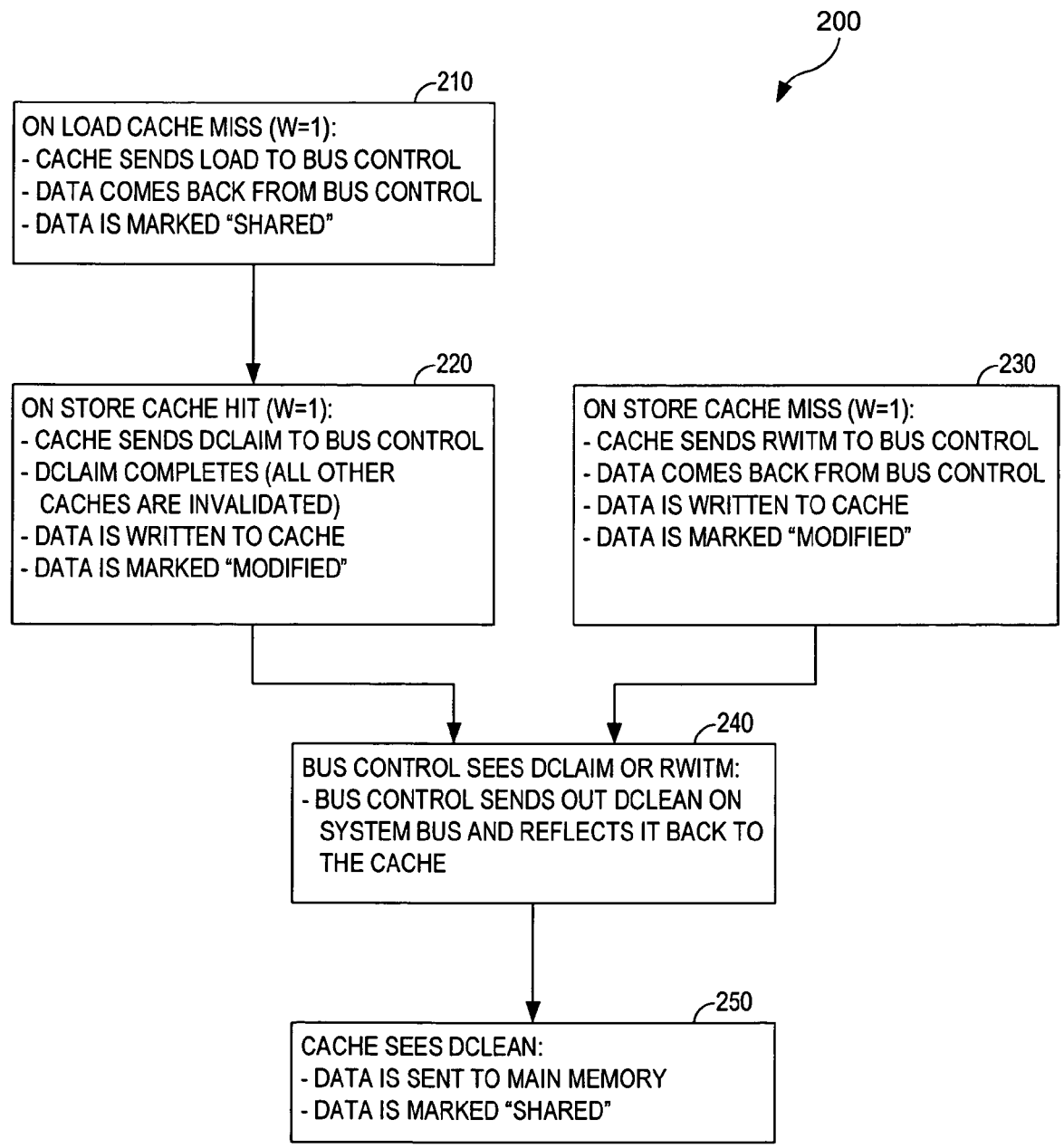
FIG. 2 illustrates a method for generating a coherent bus command.

Turning now to FIG. 2, illustrated is a method 200 for using the bus controller 150; demonstrating hardware to issue a DCLEAN command, instead of issuing a DCBST command by software, as occurred in the prior art. In step 210, a load operation to the cache 140 is issued by the processing core 110, and according to the cache directory 130, the information is not found in the cache 140. Therefore, in step 210, the cache 140 sends out a load request over the system bus 180, and receives the requested data back over the bus 180, perhaps from main memory 190 or perhaps from other processors. The requested data is then stored in the cache 140, and marked as shared. In a write-through cache system, the cache line from a load cannot be marked in an exclusive state, as any address that can ever be used for a write-through store operation cannot be marked as exclusive.

In one embodiment, a write-through instruction can be indicated in several ways. One way is by setting a storage control attribute for a page (4 KB block of memory), like the "W" bit in the PowerPC architecture. This is controlled by software and is independent of the memory range. In this embodiment, the memory range is not necessary. There are several ways to indicate a write-through store operation. These indicators are independent of the system 100 or method 200. For example, another way is to use the memory range 160 identifier coupled into the bus behavior. Either way, as long as the bus controller can read the indications and discern that the store operation should be write-through, then system 100 can generate the bus command (DCLEAN) to maintain coherency with memory.

In step 220, a write-through store operation is then performed by the processing core 110, to the same address as was previously loaded in the cache 140. Because the cache 140 is marked shared, the cache issues a bus operation, often called a DCLAIM that causes all other caches in the system to invalidate the cache line if they have it. This gives the cache 140 sole ownership of the cache line. This enables the cache 140 to perform the store and still maintain the data integrity of the system 100.

Alternatively, in step 230, a write-through store instruction is issued by the processing core 110 and misses the cache 140. Because the cache 140 does not hold the desired address, a bus operation is sent to the rest of the system to bring the data into the cache. This operation is termed a "read with Intent to Modify RWITM."

In any event, in step 240, the state machine 170 of the bus controller 150 sees either a DCLAIM or a RWITM, determines that this is from a write-through operation, and then the bus controller 150 sends out a DCLEAN onto the system bus 180, which is sent to the main memory 190 and to all processors including the one that generated the DCLAIM or RWITM.

The DCLEAN operation is broadcast to all processors (including processor 105) in the system from the bus controller in the form of a snoop command (this is what cache 140 sees). This is done via the system bus 180. All processors in the system respond to the snoop (including cache 140 which responds by pushing the modified data out to main memory 190) and the snoop response is read by the bus controller.

Finally, in step 250, the cache 140 also eventually sees the DCLEAN command. The DCLEAN command tells the cache 140 to "push" the modified data to the main memory 190. However, the cache 140 remains valid, and is taken from the modified state to the shared state. The data in the cache 140 is now coherent with what is in main memory. A DCLAIM command is sent by the cache 140 to claim sole ownership of the cache line BEFORE the store actually modifies the data in cache 140. This is to maintain data integrity. The DCLEAN is sent on the bus by the bus controller 150 in response to seeing the DCLAIM. The purpose of the DCLEAN is to push the modified data in cache 140 (now incoherent with memory because the cache has received the DCLEAN after the store has update the cache data) out to main memory.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A method for creating a write-through cache scheme, comprising:
    sending a store data command to a cache line of a cache array from a processing unit;
    sending a write-through command to a system bus in response to the store data command;
    employing a hardware implemented bus controller to automatically sense, within the hardware of the hardware implemented bus controller, without employing software within the hardware implemented bus controller, the write-through command; and
    automatically generating a clean command by the hardware implemented bus controller in the hardware of the hardware implemented bus controller, without employing software within the hardware implemented bus controller, in response to sensing the write-through command.

2. The method of claim 1, wherein the write-through command comprises at least one of a DCLAIM command or a Read With Intent to Modify (RWITM) command.

3. The method of claim 1, wherein employing the hardware implemented bus controller to automatically sense the write-through command, comprises:
    implementing a state machine in hardware of the hardware implemented bus controller; and
    monitoring for a store data command requiring a write-through command using the state machine of the hardware implemented bus controller.

4. The method of claim 3, wherein employing the hardware implemented bus controller to automatically sense the write-through command, further comprises:
    automatically generating a write-through command in response to the state machine sensing a store data command requiring a write-through command.

5. The method of claim 4, wherein the write-through command is a DCLAIM command if the processing unit has a target cache line of the store data command in the cache array, and wherein the write-through command is a Read With Intent to Modify (RWITM) command if the processing unit does not have the target cache line of the store data command in the cache array.

6. The method of claim 1, wherein automatically generating a clean command by the hardware implemented bus controller comprises:
    outputting the clean command to a system bus coupled to the processing unit;
    reflecting the clean command to the cache array; and
    pushing data corresponding to the clean command to a main memory if the data is non-coherent in the cache array.

7. The method of claim 1, wherein employing the hardware implemented bus controller to automatically sense the write-through command, comprises:
    filtering a memory address associated with the store data command using a storage control attribute for a page of memory, wherein the storage control attribute specifies memory addresses associated with the page of memory for which write-through commands are required.

8. A system, comprising:
    a processing core;
    a data cache coupled to the processing core;
    a state machine coupled to the data cache, the state machine being implemented in hardware without employing software instructions and being configured to automatically detect a write-through command, the state machine further being configured to automatically send out a clean command, generated by the hardware of the state machine, upon detection of the write-through command, wherein the clean command causes a cache coherency operation to be performed in at least one processing core of the system.

9. The system of claim 8, wherein the write-through command comprises at least one of a DCLAIM command or a Read With Intent to Modify (RWITM) command.

10. An apparatus, comprising:
    a processing core;
    a cache array coupled to the processing core;
    a hardware implemented bus controller coupled to the processing core; and
    a system bus coupled to the processing core and the hardware implemented bus controller, wherein the processing core sends a store data command to a cache line of the cache array, and sends a write-through command to a system bus in response to the store data command, and wherein the hardware implemented bus controller:
    automatically senses, within the hardware of the hardware implemented bus controller, without employing software within the hardware implemented bus controller, the write-through command; and automatically generates a clean command in the hardware of the hardware implemented bus controller, without employing software within the hardware implemented bus controller, in response to sensing the write-through command.

11. The apparatus of claim 10, wherein the hardware implemented bus controller implements a state machine in hardware of the hardware implemented bus controller, and wherein the hardware implemented bus controller automatically senses the write-through command by monitoring for a store data command requiring a write-through command using the state machine of the hardware implemented bus controller.

12. The apparatus of claim 11, wherein the hardware implemented bus controller automatically generates a write-through command in response to the state machine sensing a store data command requiring a write-through command.

13. The apparatus of claim 12, wherein the write-through command is a DCLAIM command if the processing core has a target cache line of the store data command in the cache array, and wherein the write-through command is a Read With Intent to Modify (RWITM) command if the processing core does not have the target cache line of the store data command in the cache array.

14. The apparatus of claim 10, wherein the hardware implemented bus controller automatically generates a clean command by:

outputting the clean command to the system bus;
reflecting the clean command to the cache array; and
pushing data corresponding to the clean command to a main memory if the data is non-coherent in the cache array.

15. The apparatus of claim 10, wherein the hardware implemented bus controller automatically senses the write-through command by:

filtering a memory address associated with the store data command using a storage control attribute for a page of memory, wherein the storage control attribute specifies memory addresses associated with the page of memory for which write-through commands are required.

16. A system, comprising:

a plurality of processors; and
a system bus coupled to the plurality of processors, wherein at least one processor of the plurality of processors comprises a hardware implemented bus controller, and wherein the hardware implemented bus controller:

automatically senses, within the hardware of the hardware implemented bus controller, without employing software within the hardware implemented bus controller, a write-through command; and automatically generates a clean command in the hardware of the hardware implemented bus controller, without employing software within the hardware implemented bus controller, in response to sensing the write-through command.

* * * * *